United States Patent Office 3,249,488
Patented May 3, 1966

3,249,488
LAMINATED SAFETY GLASS
George E. Mont, Springfield and Edward Lavin, Longmeadow, Mass., assignors, by mesne assignments, to Monsanto Company, a corporation of Delaware
No Drawing. Filed May 17, 1965, Ser. No. 456,501
19 Claims. (Cl. 161—199)

This invention relates to improved laminated safety-glass. More paraticularly, this invention relates to laminated safety-glass having an interlayer of a plasticized polyvinyl acetal containing a synergistic mixture of salts, which has higher resistance to penetration.

Laminated safety-glass comprises two or more glass panels bound with an interlayer of a transparent, adherent plastic. The usual plastic interlayer is a plasticized polyvinyl acetal resin formed in a sheet or film with a thickness of about 0.015 inch or more. The major commercial use of these safety-glass compositions is for automobile windshields, as well as for windshields in other moving vehicles. The ever increasing number of automobiles and the faster speed of travel today coupled with the greater area of modern day windshields has accentuated the need for improved laminated safety-glass. These structures must not only help protect persons in a car from being struck by flying objects from the outside but should prevent occupants from penetrating the windshield on impact after a sudden stop. The danger of being cut by glass in the windshield can occur not only when a body strikes the windshield and penetrates it but also when the windshield is broken and glass fragments are released. The interlayer therefore benefits the structure not only by adhering to the glass particles but also has the added advantage of absorbing energy on impact thereby decreasing the possibility of skull fracture which may occur when a head strikes the windshield, while also supplying added resistance to penetration.

The interlayers in present day commercial windshields usually contain about 0.1 to 0.8% moisture. It has been reported some increase in resistance to penetration is found if the moisture content of the plastic interlayer is considerably higher. However, the presence of increased moisture alone to improve the penetration resistance sufficiently is impractical because the clarity of the windshield is adversely affected by the formation of bubbles between the interlayer and the glass or within the interlayer. Further, the presence of excess moisture may cause delamination. Consequently the automotive and laminating industries have not been able to take significant advantage of this method of improving resistance to penetration.

The principal object of this invention is to provide laminated safety-glass having improved safety features.

A further object of this invention is to provide a laminated safety-glass having improved resistance to penetration by impacting objects such as the human head.

A particular object of this invention is to provide improved physical properties in laminated safety-glass.

Another object of this invention is to provide methods and means to accomplish the preceding objects.

These and other objects are accomplished in a laminated safety-glass by bonding two glass panels with an interlayer of a plasticized polyvinyl acetal resin; said interlayer having a moisture content of 0.1 to 0.8% by weight and containing sufficient salts of organic acids to produce an Alkalinity Titer of 10 to 50, said salts being a mixture of at least one metal acetate and at least one metal salt of a saturated aliphatic monocarboxylic acid having from 3 to 22 carbon atoms, wherein the metal portion is independently selected from the groups comprising alkali metals, alkaline earth metals, and metals of Groups I–B, II–B and III–A of the Periodic Table, said mixture containing sufficient metal acetate to produce an Alkalinity Titer of at least about 5 and up to about 80% of the Total Alkalinity Titer.

The Alkalinity Titer is the number of milliliters of 0.01 normal hydrochloric acid required to neutralize 100 grams of the polyvinyl acetal resin. This is an arbitrary standard used to designate the alkalinity of the resin. The Alkalinity Titer is usually determined prior to plasticization by dissolving 7 grams of the polyvinyl acetal resin in 250 cc. of preneutralized ethyl alcohol and titrating with 0.005 normal hydrochloric acid to the endpoint using brom-phenol blue indicator and calculating from the result obtained to determine the milliliters of 0.01 normal acid required for 100 grams resin.

Heretofore it has been customary to stabilize polyvinyl acetals for interlayers with potassium or sodium hydroxide and/or potassium or sodium acetate by adding small amounts of these materials. These are normally added during the preparation of the polyvinyl acetal. Large amounts of these salts or bases tend to increase the color of the extruded plasticized resin which is undesirable in an interlayer. The presence of such alkaline materials produces the Alkalinity Titer in conventional polyvinyl acetal interlayers.

The following examples are given in illustration of the invention and are not intended as limitations thereof. All parts and percentages are by weight unless otherwise specified.

EXAMPLE I

This example uses a conventional polyvinyl acetal interlayer for safety-glass. It is a polyvinyl butyral containing 18.8% vinyl alcohol by weight and having an Alkalinity Titer of 20. This titer is due to the presence of potassium acetate in the polyvinyl butyral. The resin is plasticized with 44 parts triethylene glycol di(2-ethyl butyrate) and has a moisture content of about 0.4%. The interlayer is formed into sheets 0.015 inch thick (15 gauge) and 0.030 inch thick (30 gauge). These interlayer sheets are used as controls.

Sets of ten glass laminates are individually prepared by interposing the 15 gauge interlayer between two 24 x 36 x 0.125 inch panels of glass and by interposing the 30 gauge interlayer between two 12 x 12 x 0.125 inch panels of glass. The resulting laminataes are then subjected to a temperature of about 275° F. at a pressure of 185 p.s.i. for approximately 10 minutes to bond the laminate or panels together.

The laminates prepared by the above procedure are then subjected to Mean Break Height tests according to the recently established tentative specifications set up by the Society of Automotive Engineers, the Subcommittee on Automotive Glazing and the results tabulated in Table I.

In essence, the Mean Break Height test comprises placing the laminate in a horizontal position with a frame or edge support and while maintaining a laminate temperature of 70° F., allowing a 22 pound spherical ball (referred to as a head form) to drop from a designated height against approximately the middle of the laminate prepared with the 15 gauge interlayer. A 5 pound steel ball is used on the smaller laminate made with the 30 gauge interlayer. This test is repeated at increasing ball-drop heights to determine the approximate height in feet at which 50% of the laminates tested will resist penetration. In other words, the Mean Break Height of a laminate is a measure of the ability of that laminate to absorb the energy of an impacting object.

A standard test was used to determine the color of the resin used. This color is expressed as "percent yellow." A 7½% solution of polyvinyl butyral resin is prepared by dissolving in methanol. This test is generally conducted on the plasticized resin and so for a resin containing 44 parts plasticizer per 100 parts resin the 7½% solution is obtained by dissolving 4.7 parts plasticized resin in 45.3 parts methanol.

Absorption readings are obtained by means of a Klett Summerson Photoelectric Colorimeter. The absorption is measured at 420 m$\mu$ (blue filter) and 660 m$\mu$ (red filter) and the readings converted to percent transmission. Subtraction of the 420 m$\mu$ reading from the 660 m$\mu$ reading gives the percent yellow.

Further sets of glass laminates are similarly prepared as above using plasticized polyvinyl butyral resin containing metal salts of saturated aliphatic monocarboxylic acids at varying levels producing various Alkalinity Titers. The data on these are included in Table I in order to show the poorer penetration resistance obtained when using only either a metal acetate or a metal salt of a monocarboxylic acid. The superior penetration resistance which was found to result when one uses the synergistic mixtures of this invention is set forth in Table II. All examples listed are prepared and tested according to the procedure of Example I.

Table II illustrates the increase in Mean Break Height at lower titer levels that has been found to result when one uses the synergistic mixtures of salts disclosed in this invention. Note in Examples I–V that a metal acetate when used alone does little to increase the impact strength of the laminate except at objectionably high titer levels. Likewise, a metal salt of a saturated aliphatic monocarboxylic acid, while being more effective than the metal acetate, still requires undesirably high titer levels in order to achieve high impact strength.

Unexpectedly, the combination of the metal acetate and the metal salt of the monocarboxylic acid has been found to result in higher penetration resistance and improved color at lower titer levels. The increased impact strengths at lower titer levels become apparent when one contrasts Examples VI and XIV which deal with propionates, VII

TABLE I

Examples I–XIII

| Example | K Acetate Titer (cc.) | Salt Added | Total Titer (cc.) | Mean Break Height, feet | | Percent H$_2$O |
|---|---|---|---|---|---|---|
| | | | | 15 gauge | 30 gauge | |
| I | 20 | None | 20 | 2.3 | 7.0 | 0.40 |
| II | 29 | do | 29 | 2.4 | 7.2 | 0.40 |
| III | 42 | do | 42 | 3.0 | 8.5 | 0.43 |
| IV | 56 | do | 56 | 5.8 | 16.0 | 0.48 |
| V | 87 | do | 87 | 7.0 | 18.0 | 0.45 |
| VI | None | K propionate | 35 | 2.4 | 8.1 | 0.44 |
| VII | do | K isobutyrate | 36 | 2.4 | 10.0 | 0.41 |
| VIII | do | K 2-ethylbutyrate | 38 | 2.5 | 11.0 | 0.50 |
| IX | do | K valerate | 30 | 3.1 | 10.7 | 0.41 |
| X | do | do | 40 | 3.8 | 14.1 | 0.43 |
| XI | do | K octoanate | 30 | 2.5 | 10.9 | 0.43 |
| XII | do | K decanoate | 50 | 4.2 | 15.0 | 0.48 |
| XIII | do | K stearate | 40 | 2.8 | 12.1 | 0.45 |

In Table I the two types of metal salts comprising the synergistic combination of this invention are used independently to show that neither type will in itself provide the desired results. Note that Mean Break Heights of greater than 14 feet are achieved only at titer levels greater than 40. In contrast the data in Table II illustrates that a Mean Break Height of 14 feet is obtained with titer levels of 30 and less. This increase in penetration resistance at lower titer levels is significant in that better color result at lower titer level with given metal salts. The increased concentration of salts which was heretofore necessary in order to get high titer levels and improved impact strength also resulted in poorer color.

and XV–XVIII which deal with isobutyrates, VIII and XXV–XXVI which deal with 2-ethyl butyrates, etc.

Example XXII illustrates the criticality of the proportion of metal acetate to metal salt of the monocarboxylic acid by demonstrating the loss of the synergistic effect as the titer due to the metal acetate becomes 80% or more of the total titer.

Table III illustrates the wide range of metals that may be used as the cation in the salts of saturated aliphatic monocarboxylic acids, with equally good results in the practice of this invention.

TABLE II

Examples XIV–XXXII

| Example | K Acetate Titer (cc.) | Salt Added | Total Titer (cc.) | Mean Break Height, feet | | Percent H$_2$O |
|---|---|---|---|---|---|---|
| | | | | 15 gauge | 30 gauge | |
| XIV | 15 | K propionate | 31 | 4.1 | 11.8 | 0.34 |
| XV | 10 | K isobutyrate | 27 | 5.3 | 16.1 | 0.54 |
| XVI | 10 | do | 30 | 7.5 | 17.8 | 0.34 |
| XVII | 21 | do | 36 | 7.4 | 17.9 | 0.40 |
| XVIII | 13 | do | 36 | 7.6 | 17.9 | 0.70 |
| XIX | 15 | K valerate | 27 | 2.4 | 10.3 | 0.38 |
| XX | 15 | do | 31 | 3.7 | 14.6 | 0.37 |
| XXI | 15 | do | 48 | 5.6 | 16.5 | 0.40 |
| XXII | 25 | do | 29 | 2.6 | 8.0 | 0.39 |
| XXIII | 10 | K neopentanoate | 18 | 2.7 | 11.6 | 0.34 |
| XXIV | 10 | do | 39 | 3.3 | 15.4 | 0.38 |
| XXV | 13 | K 2-ethylbutyrate | 40 | 7.5 | 18.4 | 0.50 |
| XXVI | 13 | do | 40 | 6.9 | 17.8 | 0.41 |
| XXVII | 13 | K octoanate | 38 | 7.5 | 17.8 | 0.67 |
| XXVIII | 13 | do | 38 | 6.3 | 16.8 | 0.47 |
| XXIX | 13 | K decanoate | 40 | 6.2 | 16.9 | 0.39 |
| XXX | 13 | do | 40 | 5.9 | 16.6 | 0.41 |
| XXXI | 13 | K stearate | 35 | 5.3 | 16.0 | 0.66 |
| XXXII | 13 | do | 35 | 6.3 | 16.5 | 0.49 |

TABLE III

*Examples XXXIII–XXXIX*

| Example | K Acetate Titer (cc.) | Salt Added | Total Titer (cc.) | Mean Break Height, feet | | Percent H₂O |
|---|---|---|---|---|---|---|
| | | | | 15 gauge | 30 gauge | |
| XXXIII | 13 | K glycolate | 24 | 7.5 | 19.0 | 0.52 |
| XXXIV | 13 | do | 24 | 7.4 | 19.1 | 0.47 |
| XXXV | 0 | Mg isobutyrate | 24 | 2.6 | 11.7 | 0.37 |
| XXXVI | 13 | do | 31 | 3.8 | 14.1 | 0.46 |
| XXXVII | 15 | do | 35 | 4.7 | 15.9 | 0.41 |
| XXXVIII | 13 | Mg glycolate | 27 | 2.7 | 11.7 | 0.42 |
| XXXIX | 13 | Li glycolate | 31 | 5.9 | 16.4 | 0.42 |

Table IV is set forth to show the wide range of metals that one might use in the metal acetate and obtain equally good results in the practice of this invention.

TABLE IV

*Examples XL–XLIII*

| Example | Metal Acetate | Titer (cc.) | Salt Added | Total Titer (cc.) | Mean Break Height, feet | |
|---|---|---|---|---|---|---|
| | | | | | 15 gauge | 30 gauge |
| XL | Cd acetate | 18 | K stearate | 35 | 6+ | 16+ |
| XLI | Li acetate | 19 | K 2-ethylbutyrate | 39 | 6+ | 16+ |
| XLII | Mg acetate | 21 | K decanoate | 34 | 7+ | 16+ |
| XLIII | Zn acetate | 20 | K isobutyrate | 37 | 7+ | 17+ |

TABLE V

*Percent yellow determination*

| Example | Metal Acetate | Titer (cc.) | Salt Added | Total Titer | Mean Break Height, feet | | Percent Yellow |
|---|---|---|---|---|---|---|---|
| | | | | | 15 gauge | 30 gauge | |
| I | K acetate | 20 | None | 20 | 2.3 | 6.0 | 10.6 |
| II | do | 29 | do | 29 | 2.4 | 7.2 | 13.1 |
| IV | do | 56 | do | 56 | 5.8 | 16.0 | 18.4 |
| V | do | 87 | do | 87 | 7.0 | 18.0 | 19.2 |
| IX | K valerate | 30 | do | 30 | 3.1 | 10.7 | 14.0 |
| XIV | K acetate | 15 | K propionate | 31 | 4.1 | 11.8 | 12.9 |
| XV | do | 10 | K isobutyrate | 27 | 5.3 | 16.1 | 12.0 |
| XVIII | do | 13 | do | 36 | 7.6 | 17.9 | 13.6 |
| XXII | do | 15 | K valerate | 52 | 6.3 | 17.0 | 14.9 |
| XXV | do | 13 | K 2-ethylbutyrate | 40 | 7.5 | 18.4 | 14.7 |
| XXVII | do | 13 | K octanoate | 38 | 7.5 | 17.8 | 12.7 |
| XXXI | do | 13 | K stearate | 35 | 5.2 | 16.0 | 13.1 |

The significance of the foregoing table becomes apparent when one considers the degree of color associated with the titer necessary to achieve a Mean Break Height of 16 feet. With potassium acetate alone, a 56 titer is needed and this results in a percent yellow of 18.4. On the other hand, the synergistic mixture of Example XV gives a Mean Break Height of over 16 feet at a titer level of 27 with a percent yellow of 12.0. Equally good results can be achieved with other synergistic mixtures set forth in this invention.

The metal portion of the acetate salts used in the practice of this invention may be independently selected from the alkali metals, alkaline earth metals, and metals of Groups I–B, II–B and III–A of the Periodic Table (as set forth on pages 56–57 of Lange's Handbook of Chemistry, 9th Edition), or mixtures thereof. Potassium acetate is preferred because of the lower titer levels necessary to achieve improved penetration resistance and the improved color in the resulting laminate.

The saturated aliphatic monocarboxylic acids used in the practice of this invention should contain from 3 to 22 carbon atoms. These acids include propionic, butyric, valeric, hexanoic, octanoic, decanoic, lauric (dodecanoic), stearic, docosanoic, and the like and mixtures thereof. They may also include acids such as isobutyric, 2-ethyl butyric 2-ethyl hexanoic, isodecanoic, and the like. Substituted acids such as the hydroxyl, aryl or halogenated derivatives of such acids are also included. Hydroxyl substituted acids may include those such as hydroxybutyric acid, hydroxy valeric acid, hydroxycaproic (leucinic) acid and the like. Mixtures of all the above acids are also contemplated.

The metal portion of the salt of the monocarboxylic acid may be selected from the alkali metals, alkaline earth metals, and metals of Groups I–B, II–B and III–A of the Periodic Table. Potassium salts are preferred because of the lower titer levels achieved and the improved color in the resulting laminate.

It has been found that the titer contribution of the respective salts e.g., metal acetates and metal salts of saturated aliphatic monocarboxylic acid, is critical and must be maintained within certain limits if the synergistic effect at low titer levels is to be achieved. The metal acetate should contribute at least a titer of 5 and up to 80% of the total Alkalinity Titer.

The laminated safety-glass of this invention is especially efficient in that the improved resistance to penetration is balanced over a wide temperature range. The impact tests shown in the examples are conducted at room temperature, however, tests conducted at as low as 4° F. and as high as 120° F. indicate that these laminates exhibit improved properties over a wide temperature range.

It is well known that an increase in the thickness of the plasticized polyvinyl butyral interlayer will give some improvement to the penetration resistance of the laminates. This invention is equally applicable to the thicker laminates. In fact, the use of an 0.030 inch interlayer containing these synergistic mixtures results in Mean Break Heights more than double those of the 0.015 inch interlayers of the examples. One of the prime goals of the safety councils for safer motor vehicles is to prevent windshield penetration by any part of the human body upon collision at today's rates of speed. As a result of this invention, windshield laminates can be prepared which from test results indicate that the laminates would not be penetrated on collision impacts against stationary objects even where the automobile was travelling at speeds in excess of 25 m.p.h. In other words, at normal interlayer moisture contents, if the alkalinity level is controlled in accordance with the practice of this invention, a far superior safety laminate will result.

As earlier noted, the moisture content of the polyvinyl butyral interlayer cannot be increased too greatly if bubble problems are to be avoided. In addition, the moisture content of the interlayer is rather difficult to control since it can be affected by atmospheric conditions and the particular laminating process. Consequently, it is preferred that the moisture content be maintained rather low, i.e., 0.1 to 0.8%. On the other hand, the Alkalinity Titer of the polyvinyl butyral interlayer can be readily increased by the addition of these synergistic mixtures of salts during the preparation of the polyvinyl butyral resin. The minimum quantity of synergistic mixtures of salts necessary to effect a particular improvement in penetration resistance of the final laminate has been found to be inversely proportional in some degree to the preferred moisture content. The amount of moisture is generally kept within the range of 0.1 to 0.8% with the interlayers of this invention.

Higher moisture levels are undesirable because of the tendency to cause bubbles or blisters in the laminate. Lower moisture levels are especially difficult to attain and maintain, and in fact, it appears as if some amount of moisture is desirable. It is preferable that the interlayers have a moisture content of 0.2 to 0.6%.

Table VI illustrates the small effect of moisture within the normal moisture range in the absence of any salts on the impact strength of various sets of glass laminates. The plasticized interlayer sheets having an Alkalinity Titer of zero are prepared from a resin thoroughly washed after swelling in alcohol-water as described below.

TABLE VI

*Effect of moisture on mean break height*

| Alkalinity Titer | Percent Moisture Content | Mean Break Height, feet | |
|---|---|---|---|
| | | 15 Gauge Interlayer | 30 Gauge Interlayer |
| 0 | .06 | 2.3 | 7.5 |
| 0 | .31 | 2.4 | 7.7 |
| 0 | .37 | 2.4 | 7.8 |
| 0 | .50 | 2.8 | 8.0 |
| 0 | .75 | 3.0 | 8.3 |

In order to avoid alkali burns on processing of the resin during plasticization or extrusion and to avoid excessive sensitivity to moisture in the interlayers which may result in edge separation of the laminates it is highly preferred to limit the Alkalinity Titer so that it is not over 50. For the above reasons, it is a preferred embodiment of this invention to limit the Alkalinity Titer to a maximum of 50 within the range of 0.1 to 0.8% moisture content. The lower limit of effectiveness of the Alkalinity Titer for improved impact strength is about 10. Within a moisture content of 0.2 to 0.6%, a preferred range of Alkalinity Titer is 15 to 40. Within this preferred range especially good properties are found at 15 to 25 and especially high impact strengths are obtained at 20 to 35 titer.

In the preparation of the safety-glass laminates as described in the preceding examples, the glass and polyvinyl butyral interlayers were maintained as clean as is feasibly possible under carefully controlled conditions. The presence of lint, dust, atmospheric oils, etc., on the surface of either the glass or interlayer will affect the Mean Break Height results. If the glass or plastic is contaminated by these impurities to any great extent, the effect on Mean Break Height results can be substantial. However, the intent of the safety-glass laminators is to produce laminates as contamination-free as possible, thus reducing this problem to a minimum.

In general, the laminates are prepared by interposing the plasticized polyvinyl butyral interlayer between a pair of glass plates and then subjecting the resulting assembly to a temperature of 190 to 325° F. and a pressure of 150 to 225 p.s.i. for at least 10 minutes to bond the assembly together.

The polyvinyl acetal resins which are employed in the present invention may be made from various unsubstituted ketones containing an active carbonyl group or from mixtures of unsubstituted aldehydes and ketones. Thus, formaldehyde, acetaldehyde, propionaldehyde, butyraldehyde, valeraldehyde, hexaldehyde, benzaldehyde, crotonaldehyde, cyclohexanone and the like and mixtures thereof may be utilized. In general, the acetal resin is made by reacting an aldehyde with hydrolyzed polyvinyl ester wherein the carboxylic moiety is derived from an aliphatic acid of from 1 to 8 carbon atoms such as formate, acetate, propionate, butyrate, 2-ethylhexylate, etc. in the presence of a solvent for the product and precipitating the resin product with water. Alternate methods might include carrying out the reaction in the presence of a non-solvent dispersing medium such as water or a non-solvent mixture of water and solvent, e.g., a water-ethanol mixture. More detailed methods for preparing such resins are set forth in Morrison et al. U.S. Patent No. Re. 20,430, dated June 29, 1937, and Lavin et al. U.S. Patent No. 2,496,480.

In general, polyvinyl acetal resins made from saturated lower unsubstituted aliphatic aldehydes are the most suitable. These would include polyvinyl acetal resins made from unsubstituted saturated aliphatic aldehydes containing less than 6 carbon atoms such as propionaldehyde, valeraldehyde and especially those made from formaldehyde, acetaldehyde, butyraldehyde and mixtures thereof. Particularly preferred are polyvinyl acetal resins made from butyraldehyde.

In general the polyvinyl acetal resins employed have Staudinger molecular weights ranging from about 50,000 to 600,000 and preferably from 150,000 to 270,000 and may be considered to be made up, on a weight basis, of from 5 to 25% hydroxyl groups, calculated as polyvinyl alcohol, 0 to 40% ester, and preferably acetate groups, calculated as polyvinyl ester, e.g., acetate, and the balance substantially acetal. When the acetal is butyraldehyde acetal, the polyvinyl acetal resin will preferably contain, on a weight basis, from 9 to 30% hydroxyl groups, calculated as polyvinyl alcohol and from 0 to 3% ester, e.g., acetate, groups, calculated as polyvinyl ester, the balance being substantially butyraldehyde acetal.

The resin prepared according to the above methods will contain approximately 20–30 ml. Alkalinity Titer composed generally of potassium acetate or sodium acetate depending on the process used. In order to replace these salts with the salts of this invention, the resin is swelled in a mixture of alcohol-water (0.960 sp. gr.) at about 40° C. for about 1 hour and then washed thoroughly with water until the dried resin is neutral to brom-phenol blue in the Alkalinity Titer test. Appropriate amounts of the salts of this invention are then added to a slurry of the washed zero Alkalinity Titer resin (5 parts water per part of resin). After thirty minutes the grains are filtered and dried. Uniform distribution of the salts is further effected by the plasticization step.

However, it is readily apparent that when one uses the synergistic mixtures of this invention it may not be necessary to wash any or all of the metal acetate out of the resin. In instances where the proper amount of metal acetate is already present in the resin, as a result of the stabilization procedure, one would simply add the desired amount of the metal salt of the monocarboxylic acid.

An alternate method of adding the salts to a zero titer resin is by adding it with the plasticizer during the plasticization step.

The resin produced may be plasticized to the extent of about 20 to 60 parts plasticizer per 100 parts resin and more commonly between 40 and 50 parts for normal windshield use. This latter concentration is generally used with polyvinyl butyrals containing 18 to 23% vinyl alcohol by weight. In general, the plasticizers which are commonly employed are esters of a polybasic acid or a polyhydric alcohol. Particularly suitable are triethylene glycol di(2-ethyl butyrate), dibutyl sebacate, and di(beta-butoxyethyl) adipate. The resulting plasticized resin mixture is then generally extruded in the form of sheets and cut to size to produce the interlayers used in the present invention. The plasticized polyvinyl butyral resin interlayer is self-adhesive in nature thereby eliminating the need for a separate adhesive to bond the glass laminate together.

Safety-glass laminates find special application in the automotive and aircraft industries for protecting passengers both against the hazards of flying objects and to reduce injury caused by bodily impact against the laminate. Wherever else glass or transparent panels are utilized such as in the building trade, the protecting afforded by safety-glass has become increasingly important. The laminates of the present invention increase the advantages of utilizing safety-glass because of their improved safety performance.

It is obvious that many variations may be made in the products and processes set forth above without departing from the spirit and scope of this invention.

What is claimed is:

1. An improved laminated safety-glass comprising two layers of glass bonded to a plasticized polyvinyl acetal interlayer; said interlayer having a moisture content of 0.1 to 0.8% by weight and containing sufficient salts of organic acids to produce an Alkalinity Titer of 10 to 50, said salts being a mixture of at least one metal acetate and at least one metal salt of a saturated aliphatic monocarboxylic acid having from 3 to 22 carbon atoms, wherein the metal portion is independently selected from the groups comprising alkali metals, alkaline earth metals, and metals of Groups I–B, II–B and III–A of the Periodic Table, said mixture containing sufficient metal acetate to produce an Alkalinity Titer of at least about 5 and up to about 80% of the Total Alkalinity Titer.

2. An improved laminated safety-glass as in claim 1 wherein the polyvinyl acetal is polyvinyl butyral.

3. An improved laminated safety-glass as in claim 2 wherein the thickness of the interlayer is between 0.010 and 0.065 inch.

4. An improved laminated safety-glass as in claim 2 wherein the thickness of the interlayer is from 0.025 to 0.035 and the Alkalinity Titer is not over 35.

5. An improved laminated safety-glass as in claim 2 wherein the polyvinyl butyral has a vinyl alcohol content of 9 to 30% by weight and is plasticized with from 20 to 50 parts of plasticizer per 100 parts of polyvinyl butyral.

6. An improved laminated safety-glass as in claim 2 wherein the metal acetate is potassium acetate and the monocarboxylic acid salt is potassium isobutyrate.

7. An improved laminated safety-glass as in claim 2 wherein the metal acetate is potassium acetate and the monocarboxylic acid salt is potassium octanoate.

8. An improved laminated safety-glass as in claim 2 wherein the metal acetate is a mixture of potassium acetate and magnesium acetate and the monocarboxylic acid is a mixture of potassium propionate and zinc 2-ethylbutyrate.

9. An improved laminated safety-glass comprising two layers of glass bonded to a plasticized polyvinyl butyral interlayer; said interlayer having a moisture content of 0.2 to 0.6% by weight and containing sufficient salts of organic acids to produce an Alkalinity Titer of 20 to 35, said salts being a mixture of at least one metal acetate and at least one metal salt of a saturated aliphatic monocarboxylic acid having from 3 to 22 carbon atoms, wherein the metal portion is independently selected from the groups comprising alkali metals, alkaline earth metals, and metals of Groups I–B, II–B and III–A of the Periodic Table, said mixture containing sufficient metal acetate to produce an Alkalinity Titer of at least about 5 and up to about 80% of the Total Alkalinity Titer.

10. An improved interlayer for laminated safety-glass comprising of a plasticized polyvinyl acetal resin; said interlayer having a moisture content of 0.1 to 0.8% by weight and containing sufficient salts of organic acids to produce an Alkalinity Titer of 10 to 50, said salts being a mixture of at least one metal acetate and at least one metal salt of a saturated aliphatic monocarboxylic acid having from 3 to 22 carbon atoms, wherein the metal portion is independently selected from the groups comprising alkali metals, alkaline earth metals, and metals of Groups I–B, II–B and III–A of the Periodic Table, said mixture containing sufficient metal acetate to produce an Alkalinity Titer of at least about 5 and up to about 80% of the Total Alkalinity Titer.

11. An improved interlayer as in claim 10 wherein the polyvinyl acetal is polyvinyl butyral.

12. An interlayer as in claim 11 wherein the polyvinyl butyral has a vinyl alcohol content of 9 to 30% by weight and is plasticized with from 20 to 50 parts of plasticizer per hundred parts of polyvinyl butyral.

13. An interlayer as in claim 11 wherein the metal acetate is potassium acetate and the monocarboxylic acid salt is potassium isobutyrate.

14. An interlayer as in claim 11 wherein the metal acetate is potassium acetate and the monocarboxylic acid salt is potassium octanoate.

15. An interlayer as in claim 11 wherein the metal acetate is a mixture of potassium acetate and magnesium acetate and the monocarboxylic acid is a mixture of potassium propionate and zinc 2-ethylbutyrate.

16. An interlayer as in claim 11 having a thickness between 0.010 and 0.065 inch.

17. An interlayer as in claim 11 having a thickness between 0.025 and 0.035 inch.

18. An improved interlayer for laminated safety-glass comprising of a plasticized polyvinyl acetal resin; said interlayer having a moisture content of 0.2 to 0.6% by weight and containing sufficient salts of organic acids to produce an Alkalinity Titer of 20 to 35, said salts being a mixture of at least one metal acetate and at least one metal salt of a saturated aliphatic monocarboxylic acid having from 3 to 22 carbon atoms, wherein the metal portion is independently selected from the groups comprising alkali metals, alkaline earth metals, and metals of Groups I–B, II–B and III–A of the Periodic Table, said mixture containing sufficient metal acetate to produce an Alkalinity Titer of at least about 5 and up to about 80° of the Total Alkalinity Titer.

19. The method of preparing an improved plasticized polyvinyl acetal interlayer which comprises mixing an aqueous slurry of a polyvinyl acetal resin containing at least one metal acetate with sufficient metal salts of saturated aliphatic monocarboxylic acid to produce a total Alkalinity Titer in the resin of 10 to 50, said resin containing sufficient metal acetate to produce a titer of at least about 5 and up to about 80% of the total titer, filtering the resin and adjusting the moisture content of the resin to 0.1 to 0.8% by weight, plasticizing the resin, and forming the interlayer.

References Cited by the Examiner

UNITED STATES PATENTS

| | | | |
|---|---|---|---|
| 2,456,462 | 12/1948 | Stamatoff | 260—73 |
| 2,496,480 | 2/1950 | Lavin et al. | 260—73 |
| 2,720,501 | 10/1955 | Van Ness | 260—73 |
| 2,859,207 | 11/1958 | Dahle | 260—73 |
| 2,860,122 | 11/1958 | Berardinelli et al. | 260—73 |
| 2,946,711 | 7/1960 | Bragaw et al. | 161—199 |

ALEXANDER WYMAN, *Primary Examiner.*

W. J. VAN BALEN, *Assistant Examiner.*